(12) United States Patent
Hendrickson et al.

(10) Patent No.: US 10,823,012 B2
(45) Date of Patent: Nov. 3, 2020

(54) FASTENER OPENINGS FOR STRESS DISTRIBUTION

(71) Applicant: United Technologies Corporation, Hartford, CT (US)

(72) Inventors: Timothy Hendrickson, West Hartford, CT (US); James Dorer, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 520 days.

(21) Appl. No.: 15/160,990

(22) Filed: May 20, 2016

(65) Prior Publication Data
US 2017/0335719 A1 Nov. 23, 2017

(51) Int. Cl.
| F01D 25/28 | (2006.01) |
| F01D 5/02 | (2006.01) |
| F16B 31/06 | (2006.01) |
| F01D 5/06 | (2006.01) |

(52) U.S. Cl.
CPC ............... *F01D 25/28* (2013.01); *F01D 5/02* (2013.01); *F01D 5/025* (2013.01); *F01D 5/066* (2013.01); *F16B 31/06* (2013.01); *F05D 2220/323* (2013.01); *F05D 2260/30* (2013.01); *F05D 2260/36* (2013.01); *Y02T 50/673* (2013.01)

(58) Field of Classification Search
CPC . F01D 5/02; F01D 5/025; F01D 25/28; F05D 2220/323; F05D 2260/30; F05D 2260/36; F16B 31/06; Y02T 50/673
See application file for complete search history.

(56) References Cited

U.S. PATENT DOCUMENTS

| 3,267,228 A * | 8/1966 | De Hertel Eastcott ..................... G01P 15/0888 200/61.46 |
| 4,828,441 A * | 5/1989 | Frasca ................... F01D 25/243 403/21 |
| 8,517,612 B2 * | 8/2013 | Metzger ................. F16C 33/58 384/475 |
| 9,909,424 B2 * | 3/2018 | Douady ................. F01D 5/027 |
| 2003/0217548 A1 | 11/2003 | Sekihara |

(Continued)

FOREIGN PATENT DOCUMENTS

| GB | 898164 | 6/1962 | |
| GB | 898164 A * | 6/1962 | ............. F01D 5/025 |
| WO | 2011150025 | 12/2011 | |

OTHER PUBLICATIONS

EP Search Report dated Oct. 19, 2017 in EP Application No. 17172020.4.

(Continued)

*Primary Examiner* — Kenneth Bomberg
*Assistant Examiner* — Jesse M Prager
(74) *Attorney, Agent, or Firm* — Snell & Wilmer L.L.P.

(57) ABSTRACT

A structure configured to rotate about an axis may include a fastener opening defined in a surface of the structure. The fastener opening may extend through the surface and include a circular portion, a first slot portion, and a second slot portion. The circular portion may include a first radius of curvature. The first slot portion may extend from the circular portion circumferentially relative to the axis. The second slot portion may also extend from the circular portion circumferentially relative to the axis.

12 Claims, 5 Drawing Sheets

(56) References Cited

U.S. PATENT DOCUMENTS

| | | | | |
|---|---|---|---|---|
| 2006/0204362 | A1* | 9/2006 | Sterner | F01D 17/165 |
| | | | | 415/191 |
| 2010/0226784 | A1* | 9/2010 | Yao | F04D 25/088 |
| | | | | 416/244 R |
| 2011/0206519 | A1* | 8/2011 | Heinemann | F01D 5/066 |
| | | | | 416/204 A |
| 2011/0293412 | A1* | 12/2011 | Afanasiev | F01D 9/042 |
| | | | | 415/208.1 |
| 2012/0315142 | A1* | 12/2012 | Bosco | F01D 5/081 |
| | | | | 416/204 R |
| 2013/0323067 | A1* | 12/2013 | Antonellis | F01D 5/3015 |
| | | | | 416/223 R |
| 2014/0003945 | A1* | 1/2014 | Perdrigeon | F01D 5/3023 |
| | | | | 416/147 |
| 2014/0147269 | A1* | 5/2014 | Porte | F02C 7/04 |
| | | | | 415/213.1 |
| 2016/0108812 | A1* | 4/2016 | Rogers | F02C 7/06 |
| | | | | 60/805 |
| 2016/0123373 | A1* | 5/2016 | Gambardella | F01D 11/003 |
| | | | | 411/108 |
| 2017/0096898 | A1* | 4/2017 | Jung | F01D 5/02 |

OTHER PUBLICATIONS

European Patent Office, European Search Report dated Aug. 12, 2019 in Application No. 17172020.4.

* cited by examiner

FASTENER OPENINGS FOR STRESS DISTRIBUTION

FIELD

The disclosure relates generally to fastener openings configured to distribute stress in a biaxial stress field, with various embodiments relating to gas turbine engines.

BACKGROUND

Gas turbine engines typically contain multiple sections. Sections may include a high pressure turbine section, low pressure turbine section, high pressure compressor section, low pressure compressor section, and combustor section, for example. These various sections and their various components may be fixed together using fasteners such as rivets or bolts. The fasteners may resist radial, axial, and circumferential forces and/or movements of the fastened components caused by engine operation. Typical fastener openings such as circular bolt holes may be subjected to stress due to spin of the fastened components, torque between the fastened components, thermal gradients, aerodynamic pressure loads, bolt preload and/or other stress sources acting upon the components. As a result, the fastener openings may tend to have a reduced life span.

SUMMARY

A mating structure is provided. The mating structure may define a fastener opening that extends through the mating structure. The fastener opening may include a circular portion with a first radius of curvature. A first slot portion and a second slot portion may extend from the circular portion.

In various embodiments, the first slot portion and the second slot portion may be curved. The fastener opening may include an end portion of the first and/or second slot portion with the end portion having a second radius of curvature less than the first radius of curvature. A first wall of the mating structure defining the first and/or second slot portion may be tangential to a second wall of the mating structure defining the end portion. The circular portion may be configured to retain a fastener. The first slot portion and the second slot portion may have a uniform width.

A structure configured to rotate about an axis is also provided. The structure may include a fastener opening defined in a radial surface of the structure. The fastener opening may extend through the radial surface and include a circular portion, a first slot portion, and a second slot portion. The circular portion may include a first radius of curvature. The first slot portion may extend from the circular portion circumferentially relative to the axis. The second slot portion may also extend from the circular portion circumferentially relative to the axis.

In various embodiments, the first slot portion and the second slot portion may have a second radius of curvature equal to a distance of the first slot portion and the second slot portion from the axis. The fastener opening may also include an end portion of the first and/or second slot portion that has a second radius of curvature less than the first radius of curvature. A first wall of the structure defining the first slot portion may be tangential to a second wall of the structure defining the end portion. The circular portion may be configured to retain a fastener radially relative to the axis. The circular portion may also be configured to retain the fastener circumferentially relative to the axis. The first slot portion and the second slot portion may comprise a uniform width in a radial direction relative to the axis. The radial surface of the structure may also have a tapered surface disposed around at least a portion of the fastener opening.

A turbine section of a gas turbine engine is also disclosed. The turbine section may include a rotor configured to rotate about an axis, a rotating structure adjacent the rotor, and a fastener passing through a fastener opening defined by at least one of the rotor or the rotating structure. The fastener opening may include a circular portion with a first radius of curvature that retains fastener circumferentially relative to the axis. A first slot portion may extend from the circular portion circumferentially relative to the axis. A second slot portion may extend from the circular portion circumferentially relative to the axis. The circular portion may be located central to the first slot portion and the second slot portion.

In various embodiments, the first slot portion and the second slot portion may have a second radius of curvature equal to a distance of the first slot portion and the second slot portion from the axis. The fastener opening may also include an end portion of the first slot portion with a radius of curvature of the end portion less than the first radius of curvature. A first wall of the rotor that defines the first slot portion may be tangential to a second wall of the rotor that defines the end portion. The first slot portion and the second slot portion may include a uniform width in a radial direction relative to the axis. The uniform width of the first slot portion and the second slot portion may be less than a diameter of the circular portion.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The present disclosure relates to fastener openings having improved stress distribution. In particular, the fastener openings of the present disclosure have a "Saturn" shaped profile to improve stress distribution. A Saturn shaped profile is similar to the planet Saturn and its rings as viewed from space.

Figure 1:
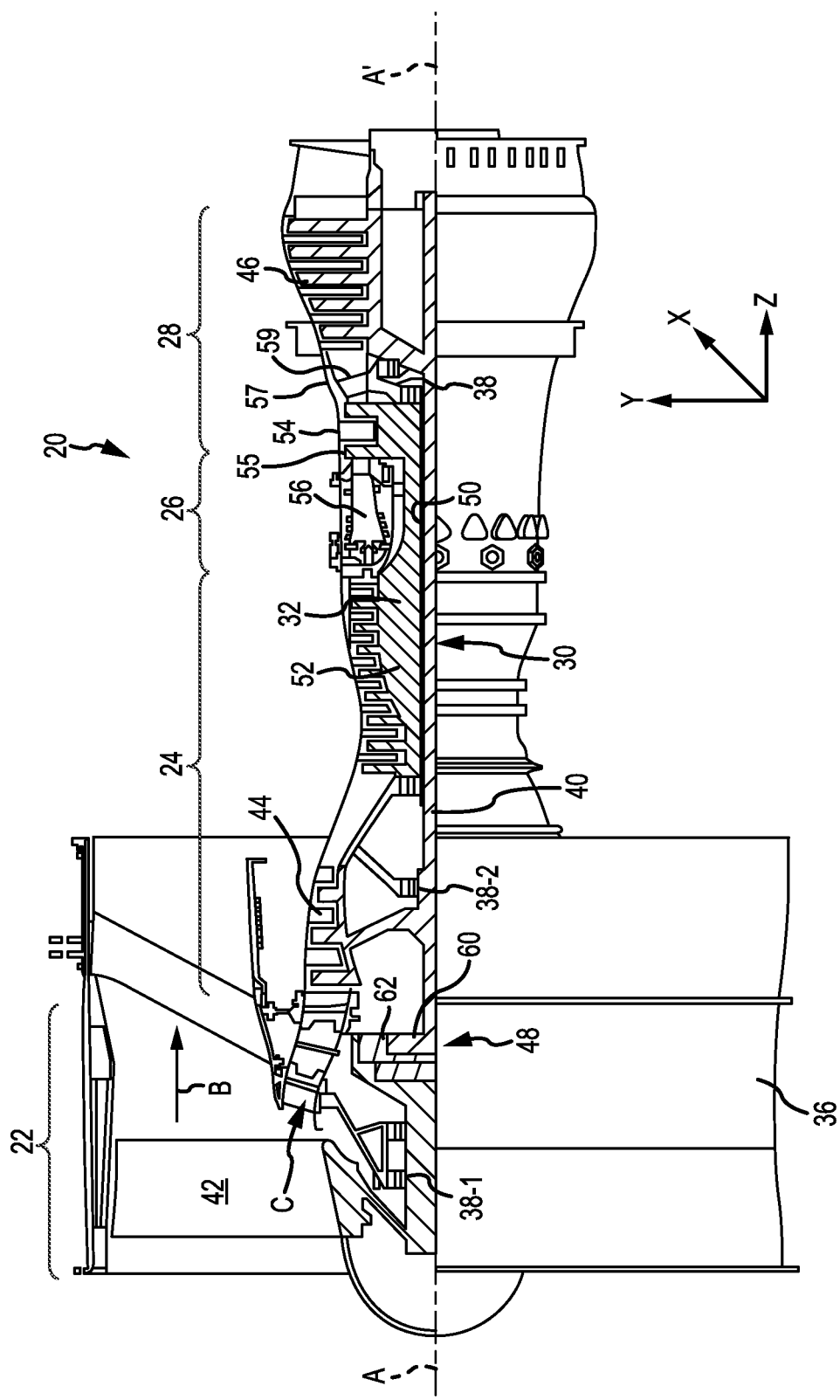
FIG. 1 illustrates an exemplary gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'.

A combustor 56 may be located between high-pressure compressor 52 and high-pressure turbine 54. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Mid-turbine frame 57 includes airfoils 59, which are in the core airflow path. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low-pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low-pressure compressor 44. Low-pressure turbine 46 pressure ratio may be measured prior to inlet of low-pressure turbine 46 as related to the pressure at the outlet of low-pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
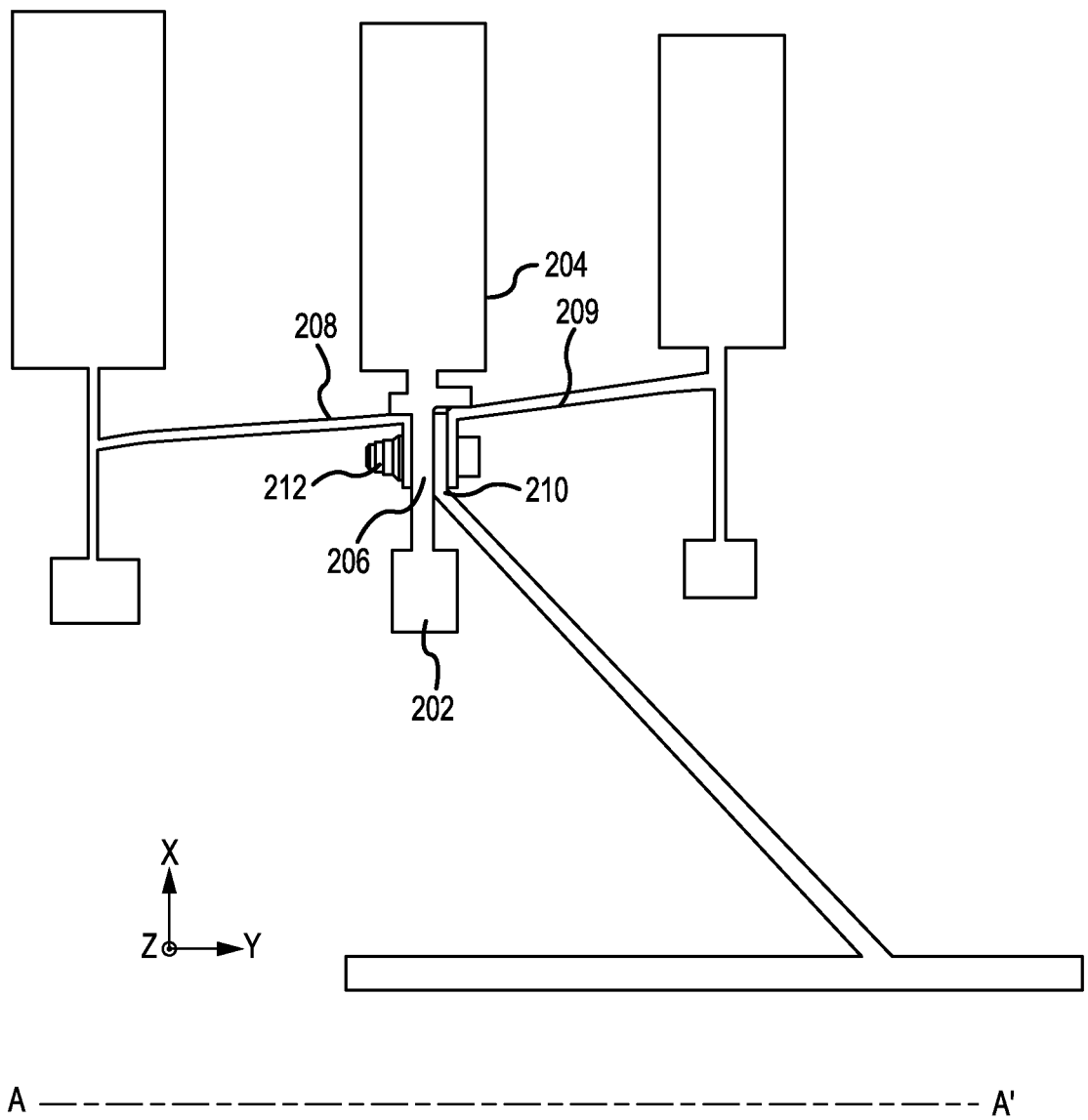
FIG. 2 illustrates a cross-sectional view of rotor assembly having structures fixed by a fastener, in accordance with various embodiments.

Various components and structures in gas turbine engine 20 may be mechanically coupled via fasteners such as bolts or rivets. The fasteners may pass through fastener openings configured to retain the structures relative to one another. Referring now to FIG. 2, an exemplary rotor assembly 200 is shown, in accordance with various embodiments. Rotor assembly 200 may be a portion of a rotating engine structure such as, for example, a turbine or compressor section of gas turbine engine 20 (of FIG. 1). Rotor assembly 200 may include a rotor 202. Rotor 202 may be coupled to an airfoil 204. Rotor 202 may also be coupled to rotating structure 208 and rotating structure 209, which each have an annular geometry. Body 206 of rotor 202 may also be mechanically coupled to rotating structure 210 having frustoconical geometry.

Fastener 212 may pass through at least two of rotating structure 208, body 206, rotating structure 209, and/or rotating structure 210 to mechanically couple the aforementioned components of rotor assembly 200. Fastener 212 may extend through fastener openings in the y direction (i.e., the direction of axis A-A' of gas turbine engine 20 in FIG. 1). In response to rotation of rotor assembly 200, fastener 212 may resist radial or circumferential forces apparent in the x-z plane. In that regard, fastener 212 may also resist forces caused by rotors rotating with respect to one another. Fastener openings of the present disclosure may tend to optimize the biaxial stress field (i.e. minimizes the stress) around the fastener openings caused by normal engine operation, including the rotation of rotor 202 about axis A-A, as well as thermal and aerodynamic pressure loads applied to rotor 202.

Figure 3:
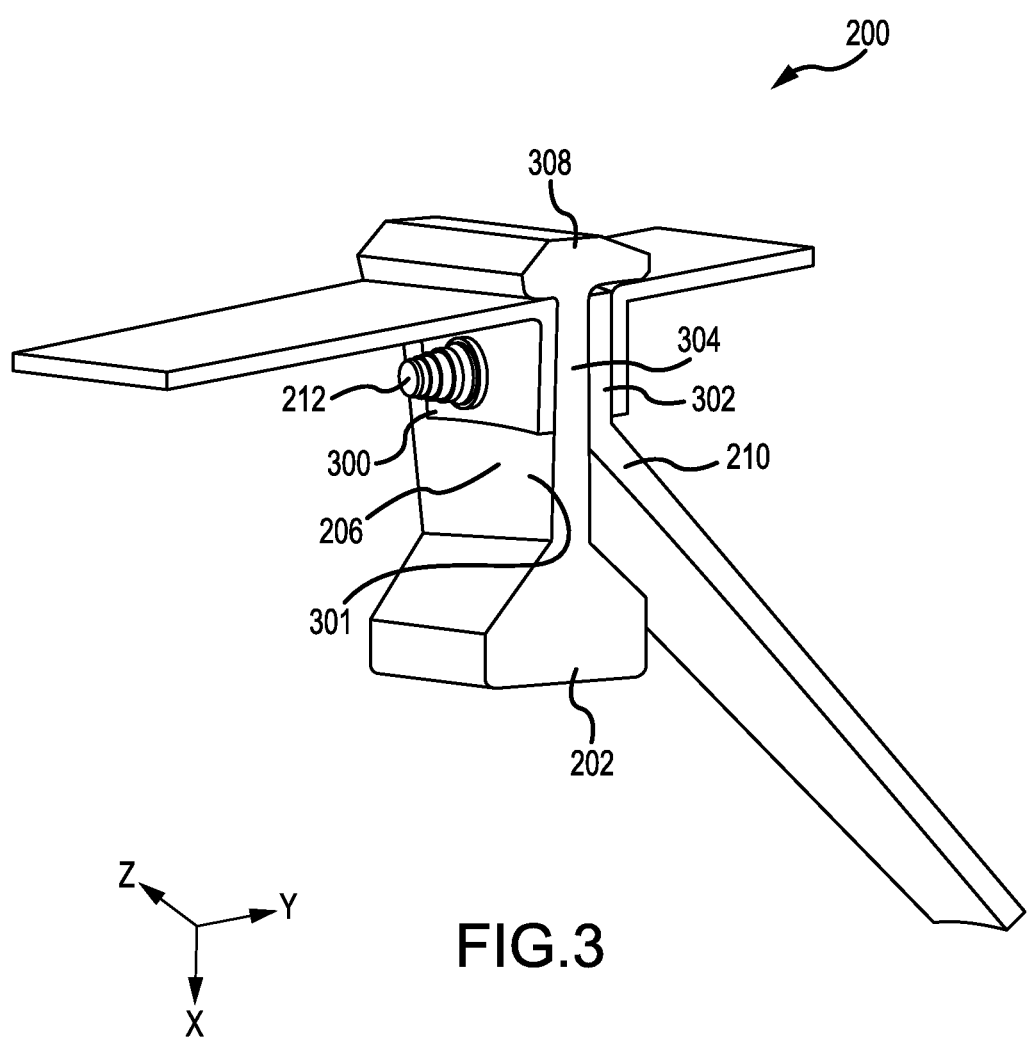
FIG. 3 illustrates a perspective view of a section of a rotor assembly having structures fixed by a fastener, in accordance with various embodiments.

Referring now to FIG. 3, rotor assembly 200 is shown in perspective, in accordance with various embodiments. Rotor 202 of rotor assembly 200 has a face 301 that is substantially flat and coplanar with the x-z plane (i.e., the plane orthogonal to axis A-A' of FIG. 1). Mating flange 300 may be oriented to lie against face 301 with fastener 212 passing through mating flange 300 and body 206 in the y direction. Mating flange 300 may also be oriented in an x-z plane. Fastener 212 may also pass through, in the y direction, mating flange 304 of rotating member 209 and/or through mating flange 304 of rotating structure 210. Mating flange 304 and mating flange 302 may also be oriented in an x-z plane orthogonal to the y axis (i.e., axis A-A' of FIG. 1). Base 308 of airfoil 204 (of FIG. 2) is shown at a distal end of rotor 202 having a circumferential geometry in an x-z plane with airfoil 204 cutaway for purposes of illustration. Base 308 of airfoil 204 may be slotted or grooved to hold or retain attached compressor or turbine blades.

Figure 4:
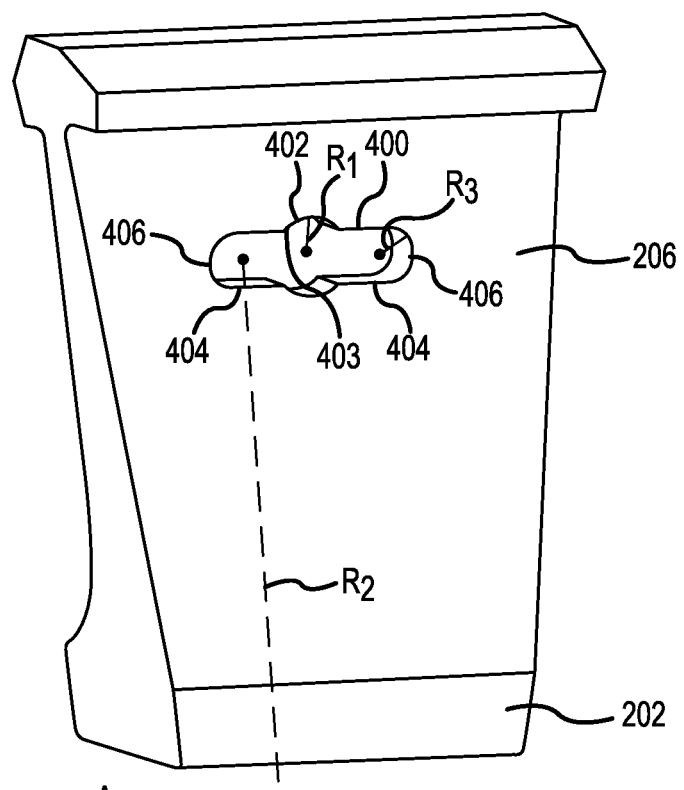
FIG. 4 illustrates a perspective view of a fastener opening configured to distribute stress, in accordance with various embodiments.

With reference to FIG. 4, fastener opening 400 defined in body 206 of rotor 202 is shown, in accordance with various embodiments. Although fastener opening 400 is illustrated on rotor 202, fastener opening 400 may be implemented in place of other more traditional fastener opening designs on any surface subjected to biaxial stress with such openings tending to minimize stress. For example and with brief reference to FIG. 3, fastener opening 400 may be formed in mating flange 300, mating flange 302, and/or mating flange 304. Fastener opening 400 may also be implemented on components outside of gas turbine engines with the fastener openings tending to minimize stress when compared to more traditional fastener opening designs. For example, fastener openings may be applicable in gas turbine case flanges, mating flanges, case bosses, or any other mated component with forces operating in two directions.

Returning to FIG. 4, fastener opening 400 may be formed in structures such as turbine and/or compressor sections of an engine. For example, fastener opening 400 may be formed by removing material from existing components. Fastener opening 400 may be formed in rigid structures by, for example, using a drill for center portion 402. Manufacturing process may include, but or not limited to a circular saw or end mill machining process may be used to form slot portions 404 and end portion 406. Fastener opening 400 may also be formed with the initial components by, for example, casting with a predefined portion of the cast configured to form fastener opening 400.

Fastener opening 400 may comprise a "Saturn" geometry. Fastener opening 400 may thus be referred to as a Saturn hole or Saturn opening. A Saturn geometry may comprise a circular portion 402 with slot portions 404 extending circumferentially relative to axis A-A' from circular portion 402.

A "Saturn" geometry may be comprised of circular portion 402 (having a profile similar to a standard bolt hole) with an ellipse-like shape formed by slot portions 404 centered about the center of the circular portion 402. The ellipse-like shape of slot portions 404 may extend circumferentially to either side of the circular portion 402. The relative size of slot portions 404 and circular portion 402 may be selected based on the anticipated operational stress magnitudes at the various locations of fastener opening 400. Importantly, circular portion 402 of the fastener opening 400 may provide material for anti-rotation of the bolt (and thusly, the mating rotor flanges) about the axis A-A' of rotor 202, due to the four corners that encapsulate the fastener and are located where circular portion 402 meets slot portion 404.

A fastener (such as fastener 212 of FIG. 2 or 3) may be retained within circular portion 402, with stress distributed throughout circular portion 402, slot portions 404, and end portions 406 of fastener opening 400. Circular portion 402 may be defined by surface 403 having a radial or multi-radial contour formed with reference to a radius $R_1$ of curvature centered in circular portion 402. In that regard, the center of slot portion 404 may be a distance $R_2$ from axis A-A' as slot portion 404 extends circumferentially from circular portion 402 with reference to axis A-A'. The walls of slot portions 404 of fastener opening 400 may thus be curved with curvature defined by radius $(R_2-R_3)$ and $(R_2+R_3)$ of curvature from axis A-A'. Radius $R_2$ is illustrated as a distance to the center of slot portion 404, however radius R2 may also be measured as a distance to proximal surface or distal surface of body 206 defining slot portion 404.

In various embodiments, slot portions 404 may terminate in end portions 406 defined by radius $R_3$ of curvature extending from a fixed point central to end portion 406. End portions 406 may have a radial (i.e., constant $R_3$) or multi-radial (i.e., varied $R_3$) and/or semicircular geometry. End portion 406 may be defined by rounded walls formed in body 206. The walls defining slot portion 404 may extend from rounded walls of end portion 406. Any two points of the walls defining slot portion 404 will be equidistant apart provided those two points of the walls lie on the same radial line from axis A-A'. Stated another way, slot portion 404 may have a uniform width in a radial direction (relative to axis A-A') with the width of the slot portion less than or equal to the diameter of circular portion 402 in the radial direction (relative to axis A-A'). In various embodiments, slot portion 404 may also have a non-uniform width with tapered (i.e., non-parallel walls). In that regard, slot portion 404 and end portion 406 may have an elliptical shape.

The walls of slot portion 404 may extend to the rounded walls of circular portion 402, with the wall of slot portion 404 intersecting the walls of circular portion 402 non-tangentially. As a result of the aforementioned structural relationships, radius $R_3$ of end portion 406 may be less than radius $R_1$ of circular portion 402.

Figure 5:
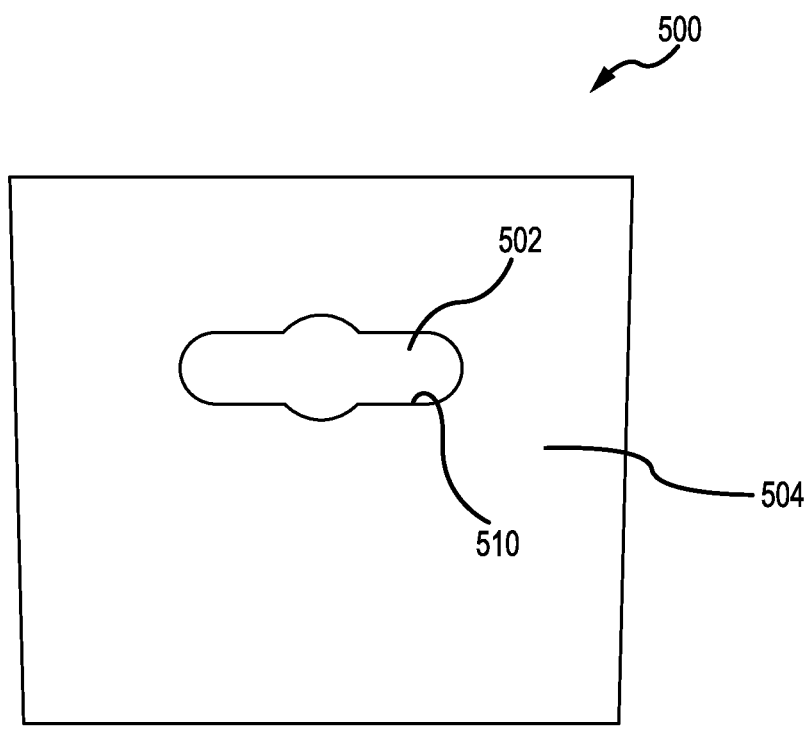
FIG. 5 illustrates an elevation view of a fastener opening configured to distribute stress, in accordance with various embodiments.

Referring now to FIG. 5, an elevation view of mounting structure 500 having a Saturn hole 502 is shown, in accordance with various embodiments. Saturn hole 502 may be similar to fastener opening 400 of FIG. 4. Saturn hole 502 may be defined through a wall 504 of a mating surface. Mounting structure 500 may be any structure subjected to biaxial stress fields.

The geometry of fastener openings of the present disclose tends to minimize stress for a given biaxial stress field. At the same time, the fastener openings may provide counter-rotation and radial location of a fastener disposed in the fastener opening.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A mating structure, comprising:
   a fastener opening defined by the mating structure and extending through the mating structure, wherein the fastener opening comprises:
      a circular portion defined by the mating structure and comprising a first radius of curvature,
      a first slot portion located in the mating structure, defined by radially spaced proximal and distal walls, and extending from the circular portion, the first slot portion continuous with the circular portion,
      an end portion on the first slot portion, the end portion comprising a second radius of curvature less than the first radius of curvature, and
      a second slot portion located in the mating structure, defined by radially spaced proximal and distal walls, and extending from the circular portion, the second slot portion comprising a third radius of curvature less than the first radius of curvature, wherein the circular portion is located between the first slot portion and the second slot portion, wherein the mating structure comprises a gas turbine rotor body, wherein the first slot portion and the second slot portion comprise a curvature defined by a radius extending from a center of one of the first slot portion or the second slot portion to an engine central longitudinal axis, and wherein the circular portion, the first slot portion, and the second slot portion are defined in a single plane perpendicular to the central longitudinal axis.

2. The mating structure of claim 1, wherein the proximal and distal walls defining the first slot portion are tangential to a second wall of the mating structure defining the end portion.

3. The mating structure of claim 2, wherein the circular portion is configured to retain a fastener.

4. The mating structure of claim 2, wherein the first slot portion and the second slot portion comprise a uniform width.

5. A structure configured to rotate about an axis, comprising:
   a fastener opening comprising:
      a circular portion defined by the structure and comprising a first radius of curvature,
      a first slot portion located in the structure, defined by radially spaced proximal and distal walls, and extending from the circular portion circumferentially relative to the axis, the first slot portion continuous with the circular portion,
      an end portion on the first slot portion comprising a second radius of curvature less than the first radius of curvature, wherein the proximal and distal walls defining the first slot portion are tangential to a second wall of the structure defining the end portion, and
      a second slot portion located in the structure, defined by radially spaced proximal and distal walls, and extending from the circular portion circumferentially relative to the axis, the second slot portion comprising a third radius of curvature less than the first radius of curvature, wherein the first slot portion joins the circular portion opposite the second slot portion, wherein the structure comprises a gas turbine rotor body, wherein the first slot portion and the second slot portion comprise a curvature defined by a radius extending from a center of one of the first slot portion or the second slot portion to the axis, and wherein the circular portion, the first slot portion, and the second slot portion are defined in a single plane perpendicular to the axis.

6. The structure of claim 5, wherein the circular portion is configured to retain a fastener radially relative to the axis.

7. The structure of claim 6, wherein the circular portion is configured to retain the fastener circumferentially relative to the axis.

8. The structure of claim 5, wherein the first slot portion and the second slot portion comprise a uniform width in a radial direction relative to the axis.

9. The structure of claim 8, wherein a radial surface of the structure comprises a tapered surface disposed around at least a portion of the fastener opening.

10. A rotating component of a gas turbine engine, comprising:
   a rotor of a compressor section configured to rotate about an axis;
   a rotating structure adjacent the rotor;
   a fastener passing through a fastener opening defined by at least one of the rotor or the rotating structure, wherein the fastener opening comprises:
      a circular portion comprising a first radius of curvature and configured to retain the fastener circumferentially relative to the axis, a first slot portion defined by radially spaced proximal and distal walls and extending from the circular portion circumferentially relative to the axis, the first slot portion continuous with the circular portion, an end portion on the first slot portion comprising a second radius of curvature less than the first radius of curvature, wherein the proximal and distal walls defining the first slot portion are tangential to a second wall of the end portion, and a second slot portion defined by radially spaced proximal and distal walls and extending from the circular portion circumferentially relative to the axis, the second slot portion comprising a third radius of curvature less than the first radius of curvature, wherein the circular portion is located between the first slot portion and the second slot portion, wherein the first slot portion and the second slot portion comprise a curvature defined by a radius extending from a center of one of the first slot portion or the second slot portion to the axis, and wherein the circular portion the first slot portion, and the second slot portion are defined in a single plane perpendicular to the axis.

11. The rotating component of claim 10, wherein the first slot portion and the second slot portion comprise a uniform width in a radial direction relative to the axis.

12. The rotating component of claim 11, wherein the uniform width of the first slot portion and the second slot portion is less than a diameter of the circular portion.

* * * * *